UNITED STATES PATENT OFFICE.

RANDALL T. CURTIS, OF LOS ANGELES, CALIFORNIA.

FRICTIONLESS TRACK LINK.

1,404,740.   Specification of Letters Patent.   Patented Jan. 31, 1922.

Application filed October 23, 1919. Serial No. 332,824.

*To all whom it may concern:*

Be it known that I, RANDALL T. CURTIS, a citizen of the United States, residing at Los Angeles, in the county of Los Angeles, State of California, have invented new and useful Improvements in Frictionless Track Links, of which the following is a specification.

The present invention relates to chains and particularly to pintle chains. It is an object of the invention to provide a chain of this character particularly adapted for use in caterpillar tractors and in which friction and wear are reduced to a minimum.

Chains used in conveying machinery, for drives, in agricultural machinery, etc., are subject to hard usage and generally receive very little attention. For these reasons ordinary chains are very inefficient and wear very rapidly. By the present invention a chain is provided in which friction and wear are reduced to a minimum and which will operate efficiently under extreme adverse conditions.

The construction of the chain provided by the present invention is such that lubrication is unnecessary and the chain is not seriously affected by dirt. These features make the chain particularly adapted for use in agricultural machinery and particularly in caterpillar tractors and the like. A further feature of the invention is the construction which makes it possible to easily and inexpensively reset or renew the bearing members occassionally and thereby put the chain in perfect operating condition. This feature of the invention is of particular importance as it makes it possible to make the links of comparatively inexpensive material and helps to make the chain of great commercial value.

There are further objects and features of the invention which will be best understood from the following detailed description of a preferred embodiment of the invention throughout which reference is had to the accompanying drawings, in which—

Figure 1:
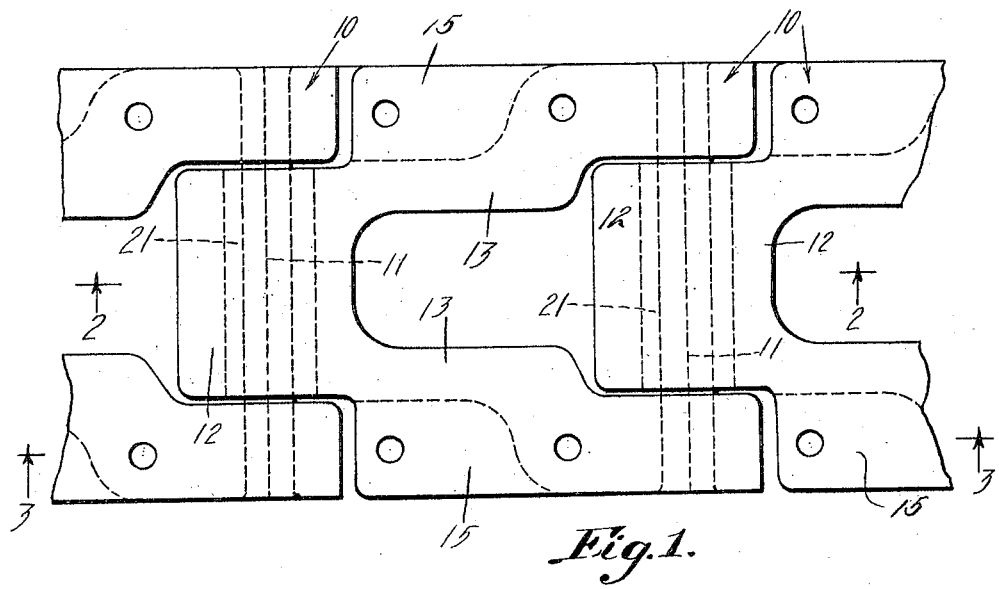
Figure 2:
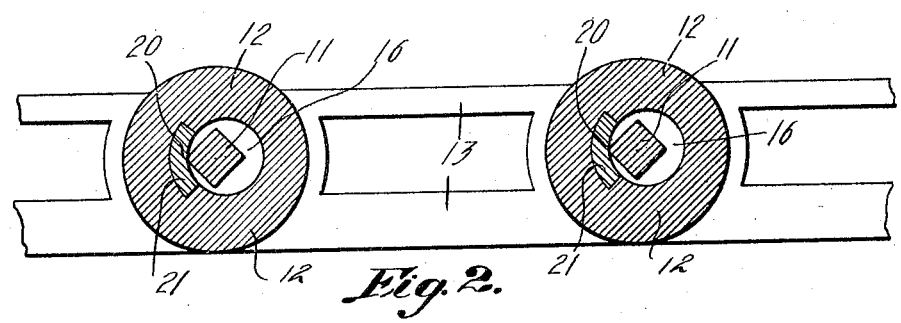
Figure 3:
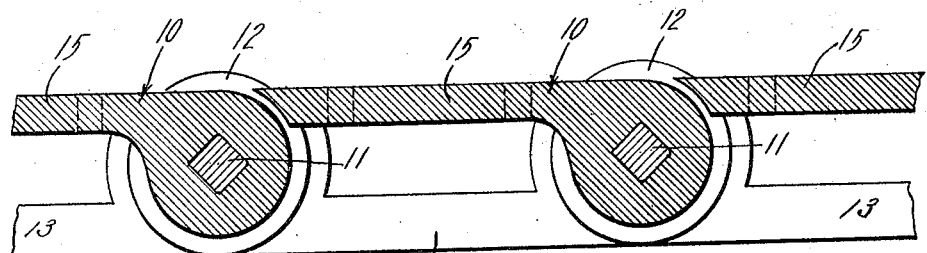

Fig. 1 is a plane view of a short length of chain; Fig. 2 is a section taken as indicated by line 2—2 on Fig. 1; and Fig. 3 is a section taken as indicated by line 3—3 on Fig. 1.

Throughout the drawings numeral 10 designates links which are connected or held together by pintle pins 11. The links 10 may be of any desired form or construction and it will be understood that the particular links herein shown and described are merely typical and that the invention is not in any way limited to them. Each link 10 comprises a cross bar 12 from which extends side bars 13. The side bars 13 are preferably integral with the cross bar 12 and are so shaped that the cross bar 12 of the adjacent link can extend between their outer ends as clearly shown in Fig. 1. In the particular form of chain shown in the drawings, flanges 15 extend from the side bars 13 to form mounting brackets for conveyor buckets, flights, or treads in cases where the chain is being used on caterpillar tractors, or other devices. It will be readily understood that the flanges 15 may be of a size and shape which will best suit the device to be mounted on the chain and that if the chain is not to have devices of any kind mounted on it, it is not necessary to provide flanges of any kind on the links.

The pintle pins 11 which connect the links 10 are tightly carried in and extend between the outer ends of the side bars 13. The pins 11 in extending between the outer ends of the side bars 13 extend through bores 16 in the cross bars 12 and thereby connect the links. In the particular form of construction shown in the drawings the pins 11 are secured in the side bars 13 by riveting over or spreading their ends as shown in Fig. 1, but it will be understood that the invention is not limited to this particular form of construction and that the pins 11 may be secured in the side bars 13 in any desired manner.

It will be particularly noted that the pintle pins 11 are square in cross sectional configuration and that they fit freely through the bores 16. It will also be particularly noted that each pin 11 is carried by the side bars 13 of a link so as to have an edge 20 facing and engaging the block 21 which is set in the wall of the bore of the adjacent link, as clearly shown in the drawings. The blocks 21 are preferably hardened steel and the pintle pins 11 are also hardened steel. It will be readily understood that when the chain is in action the lines of contact of the edges 20 with the blocks 21 are the only bearing points in the chain and that the links 10 merely rock relative to each other about the lines of contact between the edges 20 and the blocks 21. Due to the fact that the bearing points between the pins 11 and the blocks 21 are practically knife edge bearings and that there is no rubbing action between the pins and the blocks to cause friction it is unnecessary to lubricate the connections in any way. The pins 11 by extending through the bores 16 are encased by the cross bars 12 so that they are protected from dirt, etc., and the links are positively locked together and can be taken apart only by withdrawal of the pins. It will also be understood that dirt getting into the chain will have very little effect upon it due to the fact that there are no rubbing bearing surfaces to become scored or cut.

The invention is not limited to pintle pins of any particular cross sectional configuration, although it is desirable and preferred that the pins be square in cross section as shown in the drawings, as such construction makes it possible to remove the pins if necessary and turn them so that new or sharp edges are brought into engagement with the blocks 21. It is also preferred that the hardened blocks 21 be made to fit the cross bars 12 so that they can be forced out of the bars if it is desired to replace them. Due to the fact that the pins 11 and the blocks 21 are the only members between which there is any appreciable wear, and that these members are easily removed and replaced, the chain can be easily and cheaply kept in efficient working condition by occasional replacement of the blocks 21 or replacement or shifting of pins 11. It is desirable, for ordinary operation of the chain, for the edges 20 to cut or form slight indentations in the surfaces of the blocks 21 in order to prevent slipping or sliding of the edges 20 on the blocks 21.

From the foregoing description it will be readily understood how the chain has an extremely high mechanical efficiency due to the elimination of rubbing or rolling surfaces. The efficiency of the chain combined with its simplicity of construction and its durability makes it particularly adapted for use in practically every class of machinery.

Having described a typical embodiment of my invention I do not wish to limit myself to the particular details herein set forth but wish to reserve to myself any changes or modifications that may appear to those skilled in the art or fall within the scope of the following claims.

Having described a preferred form of my invention, I claim:

1. In a chain, links each one of which comprises a cross bar and side bars, and pintle connections for the links, a pintle being carried by the side bars of each link to engage the cross bar of the adjacent link, each pintle being polygonal in cross sectional configuration and being adapted to be carried by the side bars so that any one of its edges may be turned to engage the cross bar of the adjacent link, to form a single line of contact therewith.

2. In a chain, links each one of which comprises a cross bar and side bars, the cross bars having transverse bores and being adapted to fit between the side bars of adjacent links, and pintle connection between the links, a pintle being carried by and between the side bars of each link so as to extend through the bore in the cross bar which extends between the side bars, the pintle being of regular polygonal cross sectional configuration and fitting through the bore and being carried by the side bars so that it may be turned so that any one of its edges only engages the wall of the bore to be free to rock about the line of contact between the pintle and the wall of the bore.

3. In a chain, links each of which comprises a cross bar and side bars, the cross bars having transverse bores and being adapted to fit between the outer ends of the side bars of adjacent links, and pintle connections between the links, each pintle being of regular polygonal cross sectional configuration, a pintle being carried by and between the outer ends of the side bars of each link so as to extend through the bore in the cross member which extends between the side bars, the pintle being adapted to be carried so that any one of its edges may be turned to engage the wall of the bore to make a single line of contact between the pintle and the wall of the bore longitudinal of the bore, the cross bar forming a housing for the portion of the pintle which extends between the side bars.

4. In a chain, links each of which comprises a cross bar and side bars, the cross bars having transverse bores, blocks set in the walls of the bores to form bearings, and being adapted to fit between the outer ends of the side bars of adjacent links, and pintle connections between the links, each pintle being of regular polygonal cross sectional configuration, a pintle being carried by and between the outer ends of the side bars of each link so as to extend through the bore in the cross member which extends between the side bars, the pintle being adapted to be arranged so that any one of its edges may be turned to engage the block set in the wall of the bore to make a single line of contact between the pintle and the block longitudinal of the bore, the cross bar forming a housing for the portion of the pintle which extends between the side bars.

5. In a chain, links each one of which comprises a cross bar and side bars, and pintle connections for the links, a pintle being carried by the side bars of each link to engage the cross bar of the adjacent link, each pintle being substantially square in cross sectional configuration and being adapted to be carried by the side bars so that anyone of its edges may be turned to engage the cross bar of the adjacent link to form a single line of contact therewith.

In witness that I claim the foregoing I have hereunto subscribed my name this 13th day of October, 1919.

RANDALL T. CURTIS.